United States Patent
Grasselli et al.

(10) Patent No.: US 8,765,035 B2
(45) Date of Patent: Jul. 1, 2014

(54) PROCESS FOR MANUFACTURING A SELF-EXTINGUISHABLE CABLE

(75) Inventors: Gianbattista Grasselli, Milan (IT); Alberto Bareggi, Milan (IT); Cristiana Scelza, Milan (IT); Marco Frigerio, Milan (IT); Paolo Veggetti, Milan (IT); Sergio Belli, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 1739 days.

(21) Appl. No.: 10/584,509

(22) PCT Filed: Dec. 24, 2003

(86) PCT No.: PCT/IT03/00855
§ 371 (c)(1),
(2), (4) Date: May 22, 2007

(87) PCT Pub. No.: WO2005/062315
PCT Pub. Date: Jul. 7, 2005

(65) Prior Publication Data
US 2007/0262483 A1    Nov. 15, 2007

(51) Int. Cl.
*B29D 7/00* (2006.01)
(52) U.S. Cl.
USPC .......... 264/45.9; 264/45.1; 264/42; 264/45.3; 264/45.4; 264/45.8; 264/46.9; 264/51; 264/52; 264/53; 264/54; 264/55
(58) Field of Classification Search
USPC ............. 264/45.9, 45.6, 45.4, 131, 135, 1.28; 521/60
See application file for complete search history.

(56) References Cited

U.S. PATENT DOCUMENTS 3,817,669 A * 6/1974 Buckner ................. 425/4 C
4,104,210 A    8/1978 Coran et al.
(Continued)

FOREIGN PATENT DOCUMENTS

EP    0 324 430 B1    7/1989
EP    0 530 940 B1    3/1993
(Continued)

OTHER PUBLICATIONS

"Tests on Electric Cables Under Fire Conditions, Part 3: Tests on Bunched Wires or Cables"; IEC Standard 332-3, Second Edition, odd numbered pages from 1-33, pp. 34, 35, 37, 39-42, and odd numbered pp. 47-53, (1992).

(Continued)

*Primary Examiner* — Jeffrey Wollschlager
*Assistant Examiner* — Stella Yi
(74) *Attorney, Agent, or Firm* — Finnegan, Henderson, Farabow, Garrett & Dunner, L.L.P.

(57) ABSTRACT

A process for manufacturing a self-extinguishing cable including at least one transmissive element and at least one flame-retardant coating in a position radially external to the at least one transmissive element, wherein the at least one coating includes an expanded flame-retardant polymeric material having (a) at least one expandable polymer; (b) at least one expanding agent; (c) at least one flame-retardant inorganic filler, in an amount of 100 parts by weight of 250 parts by weight with respect to 100 parts by weight of the at least one expandable polymer. The process includes the following steps: (i) feeding the flame-retardant polymeric material to an extruding apparatus, therein melting and mixing it; (ii) passing the flame-retardant polymeric material obtained in step (i) through at least one static mixer; and (iii) depositing by extrusion the flame-retardant polymeric material obtained in step (ii) onto the at least one transmissive element conveyed to the extruding apparatus.

31 Claims, 8 Drawing Sheets

(56) References Cited

U.S. PATENT DOCUMENTS

| | | | |
|---|---|---|---|
| 4,317,765 | A | 3/1982 | Gaylord |
| 4,916,198 | A | 4/1990 | Scheve et al. |
| 6,455,769 | B1 * | 9/2002 | Belli et al. .................. 174/23 C |
| 2003/0059613 | A1 | 3/2003 | Tirelli et al. |

FOREIGN PATENT DOCUMENTS

| | | |
|---|---|---|
| EP | 0 860 465 A1 | 8/1998 |
| EP | 1 230 647 B1 | 8/2002 |
| JP | 63-225641 | 9/1998 |
| JP | 2000-106041 | 4/2000 |
| JP | 2000106041 | * 11/2000 |
| WO | WO-99/05688 | 2/1999 |
| WO | WO-00/19452 | 4/2000 |
| WO | WO-00/39810 | 7/2000 |
| WO | WO-02/47092 A1 | 6/2002 |

OTHER PUBLICATIONS

"Norma Italiana CEI"; Norma CEI 20-11, Bozza n° 3, pp. 1, 95, 97, (1999).

* cited by examiner

PROCESS FOR MANUFACTURING A SELF-EXTINGUISHABLE CABLE

CROSS REFERENCE TO RELATED APPLICATION

This application is a national phase application based on PCT/IT2003/000855, filed Dec. 24, 2003, the content of which is incorporated herein by reference.

BACKGROUND OF THE INVENTION

1. Field of the Invention

The present invention relates to a process for manufacturing a self-extinguishing cable, such as a cable for low-voltage, medium-voltage or high-voltage power transmission or distribution, as well as a cable for data transmission or for telecommunications, for example a telephone cable, or mixed electro-optical cables.

More particularly, the present invention relates to a process for manufacturing a self-extinguishing cable which has, in a position radially external to at least one transmissive element, at least one flame-retardant coating layer comprising an expanded flame-retardant polymeric material, which is provided with both good mechanical and flame-retardant properties.

2. Description of the Related Art

A self-extinguishing cable is generally produced by providing the cable with a flame-retardant coating layer obtained from a polymeric material, for example a polymeric material based on polyolefin (such as polyethylene or ethylene/vinyl acetate copolymers), that has been given flame-resistance properties by means of suitable additives.

It is well known in the art that to get an effective flame-retardant action in order to minimize if not to avoid the flame propagation, inorganic flame-retardant fillers have to be added in very large amounts to the polymeric material in order to get a polymeric material suitable to realize self-extinguishing cables.

Inorganic flame-retardant fillers free from halogens having flame retardant properties, such as metal hydrated oxides or hydroxides, particularly aluminium or magnesium hydroxide, are among the most widely used fillers. At high temperatures, these products undergo an endothermic decomposition process that generates water, thus depriving the substrate from heat and, therefore, slowing the polymer pyrolysis reactions.

For example, Japanese Patent Application JP 2000/106041 discloses a flexible non-halogen flame-retardant electric cable. Said cable comprises (A) two strands of polyvinylchloride or polyolefin-insulated conductors or multiple strands of these insulated conductors with spacing between the twisted strands and (B) foamed non halogen fire-retardant sheaths which are formed by compounding in the olefin-based resin at least one flame-retardant agent, such as magnesium hydroxide, calcium hydroxide, barium hydroxide, aluminium hydroxide, in an amount of 50-200 wt. parts per 100 wt. parts of the resin, and an organic foaming agent, such as azodicarbonamide, p-toluenesulfonyl hydrazide, or 4,4'-oxybis (benzenesulfonylhydrazide), in an amount of 0.2-5 wt. parts per 100 wt. parts of the resin, possibly adding other processing aids or an antioxidant and getting a foaming rate of 5% to 20%. The abovementioned flame-retardant sheaths are said to have the prescribed tear load and the prescribed bending load so that the tear characteristics, the handling and processability are improved and the standard flame-resistance is ensured. No mention about the process used to make said foamed fire-retardant sheaths is made.

However, the use of these inorganic flame-retardant fillers has a number of drawbacks, the main of which is the fact that, as already reported above, in order to obtain an efficient flame-retardant action, very large amounts of the inorganic flame-retardant fillers need to be added to the polymeric material, in general about 120-250 parts by weight relative to 100 parts by weight of the polymer base. Such large amounts of fillers lead to a decline in the processability and in the mechanical and elastic properties of the resulting flame-retardant composition, in particular, with regard to its elongation at break and its stress at break.

Moreover, on the basis of the Applicant's experience, the presence of such large amounts of inorganic flame-retardant fillers makes extremely difficult to homogeneously expand the resulting flame-retardant polymeric material. As a matter of fact, the obtained expanded flame-retardant polymeric material shows poor appearance, mainly due to the formation of irregular bubbles (i.e. bubbles having irregular form, size and distribution) and swellings, which impair not only its appearance and smoothness but also its mechanical properties.

Processes useful to expand polymeric materials enclosing inorganic fillers are known in the art.

For example, European Patent Application EP 860,465 discloses a process for preparing a foamed thermoplastic article comprising heating and mixing, possibly with a static mixer, a thermoplastic elastomer selected from the group comprising styrene based thermoplastic elastomers and thermoplastic polyolefin elastomers, with an effective amount of a water containing compound, preferably aluminium trihydrate or magnesium hydroxide, to a temperature at which the compound releases water, which is a temperature higher than the melting point of the elastomer, subsequently releasing the resulting heated mixture to atmospheric conditions. The abovementioned process is said to give foamed articles having fine and uniform cell structures.

However, as the water containing compound releases water during the foaming process (i.e. undergoes decomposition during the foaming process), said compound will not be able to confer flame-retardant properties to the obtained foamed articles.

SUMMARY OF THE INVENTION

Consequently, in the Applicant's view, the technical problem of obtaining a cable endowed with both good self-extinguishing properties and good mechanical properties, in particular elongation at break and stress at break, when very large amounts of inorganic flame-retardant fillers are present in the polymeric material to be expanded, remains still unsolved.

The Applicant has unexpectedly found that the aforesaid technical problem may be solved by means of a process for manufacturing a self-extinguishing cable which makes use of a static mixer.

Particularly, the Applicant has found that such a process allows that a flame-retardant polymeric material comprising at least one expandable polymer in admixture with at least one expanding agent and at least one inorganic flame-retardant filler in a large amount (i.e. not less than 100 parts by weight with respect to 100 parts by weight of the expandable polymer) may be suitably expanded.

According to a first aspect, the present invention relates to a process for manufacturing a self-extinguishing cable comprising at least one transmissive element and at least one flame-retardant coating layer in a position radially external to said at least one transmissive element, wherein said at least one coating layer includes an expanded flame-retardant polymeric material comprising:

(a) at least one expandable polymer;
(b) at least one expanding agent;
(c) at least one flame-retardant inorganic filler in an amount of from 100 parts by weight to 250 parts by weight with respect to 100 parts by weight of said at least one expandable polymer;

the process comprising the following steps:

(i) feeding the flame-retardant polymeric material to an extruding apparatus, therein melting and mixing it;

(ii) passing the flame-retardant polymeric material obtained in step (i) through at least one static mixer;

(iii) depositing by extrusion the flame-retardant polymeric material obtained in step (ii) onto said at least one transmissive element conveyed to said extruding apparatus.

According to one preferred embodiment, said at least one expandable polymer and said at least one flame-retardant inorganic filler are premixed before the step of feeding them to the extruding apparatus.

According to one preferred embodiment, said at least one flame-retardant coating layer has electrical insulation properties. In particular, said flame-retardant coating layer is an insulation coating layer placed in a position radially external to said transmissive element. Preferably, said insulation coating layer is placed in direct contact with said transmissive element.

According to one preferred embodiment, said cable comprises at least two transmissive elements and a filling material which fills the interstitial zones between said at least two transmissive elements defining a filling layer having a structure of essentially circular cross-section, said filling material comprising said expanded flame-retardant polymeric material.

In the present specification, the term "low-voltage" means a voltage of less than about 1 kV, whereas "medium-voltage" and "high-voltage" are meant to refer to a voltage of between about 1 kV and about 30 kv and greater than about 30 kV, respectively.

In addition, for the purposes of the present specification, the term "transmissive element" of the cable is meant to refer to an electrical energy transmissive element, an optical signal transmissive element, or an element which transmits both electrical energy and optical signals.

Said transmissive elements may form a semi-finished structure comprising at least one electrical energy transmissive element and at least one electrical insulation element arranged at a radially outer position with respect to the corresponding transmissive element.

Alternatively, said transmissive elements may form a semi-finished structure comprising at least one optical signal transmissive element and at least one containment element (such as, for example, a tube, a sheath, a microsheath or a grooved core) arranged at a radially outer position with respect to the corresponding transmissive element.

Alternatively, said transmissive elements may form a semi-finished structure comprising at least one element which transmits both electrical energy and optical signals and at least two elements, one of which is an electrical insulation element and one is a containment element, arranged at a radially outer position with respect to the corresponding transmissive element.

For the purposes of the present specification, the expression "electrical energy transmissive element" is meant to refer to any element capable of transmitting electrical energy such as, for example, a metallic conductor element.

As an illustrative example, in considering a cable for transporting or distributing medium/high voltage electrical energy, the cable further comprises an inner semi-conductive coating layer arranged at a radially outer position with respect to the conductor element, an outer semi-conductive coating layer arranged at a radially outer position with respect to the electrical insulation element, a metallic screen arranged at a radially outer position with respect to said outer semi-conductive coating layer, and an external coating layer arranged at a radially outer position with respect to said metallic screen.

For the purposes of the present specification, the expression "optical signal transmissive element" is used to indicate any transmission element comprising at least one optical fibre. Therefore, such a term identifies both a single optical fibre and a plurality of optical fibres, optionally grouped together to form a bundle of optical fibres or arranged parallel to each other and coated with a common coating to form a ribbon of optical fibres.

As an illustrative example, in considering an optical cable, the cable further comprises a coating layer arranged at a radially outer position with respect to the grooved core, a tensile reinforcing layer at a radially outer position with respect to said outer coating layer, and an external coating layer arranged at a radially outer position with respect to said tensile reinforcing layer.

For the purposes of the present specification, the expression "mixed electro-optical transmissive element" is used to indicate any element capable of transmitting both electrical energy and optical signals in accordance with the abovementioned definitions.

The present invention also refers to cables provided with a plurality of conductors, known in the field with the expressions "bipolar cable", "tripolar cable" and "multipolar cable", depending on the number of conductors incorporated therein (in the mentioned cases in number of two, three, or greater, respectively).

In accordance with the abovementioned definitions, the present invention refers to cables provided with one or more conductors. In other words, the present invention refers to unipolar or multipolar cables, of electrical type for transporting or distributing electrical energy, or of the optical type comprising at least one optical fibre, or of the mixed energy/telecommunications type.

The expression "expanded flame-retardant polymeric material" means, in the present specification, a flame-retardant polymeric material with a predetermined percentage of "free" space inside the material, i.e. a space not occupied by the polymeric material, but rather by gas or air.

In general, this percentage of free space in an expanded polymer is expressed by means of the "expansion degree" or "foaming rate" (G), defined as follows:

$$G=(d_0/d_e-1)*100$$

wherein $d_0$ indicates the density of the non-expanded polymer and $d_e$ indicates the density measured for the expanded polymer.

The expanded flame-retardant polymeric material according to the present invention is obtained from an expandable polymer optionally subjected to crosslinking, after expansion, as indicated in greater detail hereinbelow in the present description.

According to one preferred embodiment, the expandable polymer may be selected from the group comprising: polyolefins, copolymers of various olefins, olefin/unsaturated ester copolymers, polyesters, polyethers, polycarbonates, polysulphones, phenolic resins, ureic resins, or mixtures thereof. Examples of suitable polymers are: polyethylene (PE), in particular low-density PE (LDPE), medium-density PE (MDPE), high-density PE (HDPE) and linear low-density PE (LLDPE); polypropylene (PP); elastomeric ethylene/propylene copolymers (EPM) or ethylene/propylene/diene terpolymers (EPDM); natural rubber; butyl rubber; ethylene/vinyl ester copolymers, for example ethylene/vinyl acetate (EVA); ethylene/acrylate copolymers, in particular ethylene/methyl acrylate (EMA), ethylene/ethyl acrylate (EEA), ethylene/butyl acrylate (EBA); ethylene/α-olefin thermoplastic copolymers; polystyrene; acrylonitrile/butadiene/styrene (ABS) resins; halogenated polymers, in particular polyvinyl chloride (PVC); polyurethane (PUR); polyamides; aromatic polyesters, such as polyethylene terephthalate (PET) or polybutylene terephthalate (PBT); copolymers or mechanical blends thereof; or mixtures thereof.

Preferably, the expandable polymer is a polyolefinic polymer or copolymer based on ethylene and/or propylene; in particular, the polymer may be selected from the group consisting of polyethylene; copolymers of ethylene with at least one α-olefin containing from 3 to 12 carbon atoms, optionally with at least one diene containing from 4 to 20 carbon atoms; polypropylene; thermoplastic copolymers of propylene with ethylene and/or at least one α-olefin containing from 4 to 12 carbon atoms; copolymers of ethylene with at least one ester selected from alkyl acrylates, alkyl methacrylates and vinyl carboxylates, wherein the alkyl and the carboxylic groups comprised therein are linear or branched, and wherein the linear or branched alkyl group may contain from 1 to 8, preferably from 1 to 4, carbon atoms, while the linear or branched carboxylic group may contain from 2 to 8, preferably from 2 to 5, carbon atoms; or mixtures thereof.

According to a further preferred embodiment, the polymer is selected from the group consisting of:

(a) copolymers of ethylene with an ethylenically unsaturated ester, for example vinyl acetate or butyl acetate, wherein the amount of unsaturated ester is generally between 5% by weight and 80% by weight, preferably between 10% by weight and 50% by weight;

(b) elastomeric copolymers of ethylene with at least one $C_3$-$C_{12}$ α-olefin, and optionally a diene, preferably ethylene/propylene copolymers (EPR) or ethylene/propylene/diene copolymers (EPDM), preferably having the following composition: 35 mol %-90 mol % of ethylene, 10 mol %-65 mol % of α-olefin, 0 mol %-10 mol % of diene (for example 1,4-hexadiene or 5-ethylidene-2-norbornene);

(c) copolymers of ethylene with at least one $C_4$-$C_{12}$ α-olefin, preferably 1-hexene, 1-octene, and optionally a diene, generally having a density of between 0.86 g/cm$^3$ and 0.90 g/cm$^3$ and the following composition: 75 mol %-97 mol % of ethylene, 3 mol %-25 mol % of α-olefin, 0 mol %-5 mol % of a diene;

(d) polypropylene modified with ethylene/$C_3$-$C_{12}$ α-olefin copolymers, wherein the weight ratio between the polypropylene and the ethylene/$C_3$-$C_{12}$ α-olefin copolymer is between 90/10 and 30/70, preferably between 50/50 and 30/70.

For example, products which fall within class (a) are the commercial products Elvax® (Du Pont), Levapren® (Bayer) and Lotryl® (Elf-Atochem), those which fall in class (b) are the products Dutral® (Enichem) and Nordel® (Dow-Du Pont) and those which fall in class (c) are the products Engage® (Dow-Du Pont) and Exact® (Exxon), while polypropylene modified with ethylene/α-olefin copolymers may be found on the market under the brand names Moplen® or Hifax® (Montell), or Fina-Pro® (Fina), and the like.

Products of class (c) are particularly preferred.

Products of class (d) that are particularly preferred are thermoplastic elastomers comprising a continuous matrix of a thermoplastic polymer, for example polypropylene, and small particles (generally with a diameter of about 1-10 μm) of a vulcanized elastomeric polymer, for example crosslinked EPR or EPDM, dispersed in the thermoplastic matrix. The elastomeric polymer may be incorporated into the thermoplastic matrix in non-vulcanized form and then dynamically crosslinked during the process by means of addition of a suitable amount of a crosslinking agent. Alternatively, the elastomeric polymer may be vulcanized separately and then dispersed in the thermoplastic matrix in the form of small particles. Thermoplastic elastomers of this type are described, for example, in U.S. Pat. No. 4,104,210 and in European Patent Application EP 324,430.

According to a further preferred embodiment, the expandable polymer may be a polypropylene with high mechanical strength in the molten state (high melt strength polypropylene), as described, for example, in U.S. Pat. No. 4,916,198, which is commercially available under the brand name Profax® (Montell S.p.A.). That document explains a process for producing said polypropylene via a step of irradiating a linear polypropylene, carried out using high-energy ionizing radiation for a period of time which is sufficient to result in the formation of a large amount of long branchings of the chain, a suitable treatment of the irradiated material being moreover envisaged at the end of said step so as to deactivate essentially all of the free radicals present in the irradiated material.

According to a further preferred embodiment, among the polymeric material particular preference is given to a polymeric composition comprising the abovementioned highly-branched polypropylene, in an amount generally of between 30% and 70% by weight, blended with a thermoplastic elastomer of the type belonging to class (d) above, in an amount generally of between 30% and 70% by weight, said percentages being expressed relative to the total weight of the polymeric composition.

According to a further preferred embodiment, the expandable polymer may be a polyolefin selected from a propylene homopolymer or a copolymer of propylene with at least one olefinic comonomer selected from ethylene and an α-olefin other than propylene, having an elastic flexural modulus generally of between 30 and 900 MPa and preferably between 50 and 400 MPa, or mixtures thereof.

Said homopolymers or copolymers exhibit a homogeneous microscopic structure, i.e. a structure that is substantially free of heterogeneous phases dispersed in molecular domains greater than one micron. Specifically, said materials do not exhibit the optical phenomena typical of heterogeneous polymer materials, and in particular are characterized by improved transparency and reduced "stress whitening" of the material due to localized mechanical stresses.

Within the homopolymers or copolymers mentioned above, particularly preferred is a propylene homopolymer or a copolymer of propylene with at least one olefinic comonomer selected from ethylene and an α-olefin other than propylene, said homopolymer or copolymer having:

a melting point of from 140° C. to 165° C.;

a heat of fusion of from 30 J/g to 80 J/g;

a fraction which is soluble in boiling diethyl ether, in an amount of less than or equal to 12% by weight, preferably from 1% to 10% by weight, having a heat of fusion of less than or equal to 4 J/g and preferably less than or equal to 2 J/g;

a fraction which is soluble in boiling n-heptane, in an amount of from 15 to 60% by weight and preferably from 20% to 50% by weight, having a heat of fusion of from 10 J/g to 40 J/g and preferably from 15 J/g to 30 J/g; and a fraction which is insoluble in boiling n-heptane, in an amount of from 40% to 85% by weight and preferably from 50% to 80% by weight, having a heat of fusion of greater than or equal to 45 J/g and preferably from 50 J/g to 95 J/g.

Further details regarding said materials and their use for coating cables are given in European Patent Application EP 1,230,647.

Homopolymers or copolymers above disclosed are commercially available, for example, under the brand name Rexflex® from Huntsman Polymer Corp.

According to one preferred embodiment, the expanding agent may be selected from compounds containing at least one nitrogen atom.

Preferably, said expanding agent may be selected from the group consisting of: ammonium salts, urea, melamine, guanidine, melamine cyanurate, guanidylurea, azodicarbonamide, hydrazides such as, para-toluenesulphonylhydrazide, benzene-sulfonylhydrazide, 4,4'-oxybis(benzenesulfonylhydrazide), azobis(isobutyronitrile), dinitro pentamethylene tetramine, expandingly acceptable derivatives thereof, or mixtures thereof. Azodicarbonamide, 4,4'-oxybis(benzene-sulfonyl-hydrazide), or mixtures thereof, are particularly preferred.

Alternatively, said expanding agent may be selected from mixtures of organic acids (for example, citric acid) with carbonates and/or bicarbonates (for example, sodium bicarbonate).

The amount of the expanding agent added to the flame-retardant polymeric material is preferably of from 0.01 parts by weight to 5.0 parts by weight, more preferably from 0.1 parts by weight to 2.0 parts by weight, with respect to 100 parts by weight of the expandable polymer.

According to a preferred embodiment, the expanding agent is compounded as a masterbatch formed by mixing the expanding agent with at least one olefin-based polymer selected among the ones above defined, preferably ethylene/vinyl ester copolymers, for example, ethylene/vinyl acetate copolymer (EVA).

Said masterbatch comprises an amount of expanding agent of from 1% by weight to 80% by weight, preferably from 10% by weight to 70% by weight, more preferably from 20% by weight to 50% by weight, with respect to the total weight of the olefin-based polymer.

Preferably, the process according to the present invention is carried out by using a flame-retardant polymeric material comprising at least two expanding agents, said expanding agents being present in a ratio of 0.5:3, preferably 1:2, most preferably 1:1.

According to one preferred embodiment, the inorganic flame-retardant fillers may be selected from the group consisting of hydroxides, hydrated oxides, salts or hydrated salts of metals, in particular of calcium, aluminium or magnesium, such as: magnesium hydroxide, alumina trihydrate, magnesium hydrated carbonate, magnesium carbonate, mixed hydrated carbonate of magnesium and calcium, mixed magnesium and calcium carbonate, or mixtures thereof. The flame-retardant filler is generally used in the form of particles which are untreated or surface-treated with saturated or unsaturated fatty acids containing from 8 to 24 carbon atoms, or metal salts thereof, such as, for example: oleic acid, palmitic acid, stearic acid, isostearic acid, lauric acid; stearate or oleate of magnesium or zinc; or mixtures thereof. In order to increase the compatibility with the polymer, the flame-retardant filler may also be surface-treated with suitable coupling agents below mentioned in detail, for example organic silanes or titanates such as vinyltriethoxysilane, vinyltriacetylsilane, tetraisopropyl titanate, tetra-n-butyl titanate, or mixtures thereof. The amount of flame-retardant filler to be added is predetermined so as to obtain a cable which is capable of satisfying the typical flame-resistance tests, for example the test according to IEC standard 332-3, Second edition, 1992-03. Preferably, as reported above, this amount is of from 100 parts by weight to 250 parts by weight, in particular from 120 parts by weight to 200 parts by weight, with respect to 100 parts by weight of the expandable polymer.

The flame-retardant polymeric material may comprise other conventional components which may be selected from the group consisting of: coupling agents, antioxidants, processing aids or co-adjuvants, lubricants, plasticizers, pigments, other fillers, water tree retardants, or mixtures thereof.

At least one coupling agent capable of increasing the interaction between the active hydroxyl groups of the inorganic flame-retardant filler and the polymer chains may be added to the flame-retardant polymeric material in order to enhance the compatibility between the flame-retardant inorganic filler and the expandable polymer. This coupling agent may be selected from those known in the art, for example: short chain saturated silane compounds or silane compounds containing at least one ethylenic unsaturation; epoxides containing an ethylenic unsaturation; monocarboxylic acids or, preferably, dicarboxylic acids having at least one ethylenic unsaturation, or derivatives thereof, in particular anhydrides or esters.

Examples of short chain silane compounds which are suitable for this purpose are: γ-methacryloxypropyltrimethoxysilane, allyltrimethoxysilane, allyltriethoxysilane, allylmethyldimethoxysilane, allylmethyldiethoxysilane, methyltriethoxysilane, methyltris (2-methoxyethoxy)silane, dimethyldiethoxysilane, vinyltris (2-methoxyethoxy)silane, vinyltrimethoxysilane, vinyl methyldimethoxysilane, vinyltriethoxysilane, octyl triethoxysilane, isobutyltriethoxysilane, isobutyl trimethoxysilane and the like, or mixtures thereof.

Examples of epoxides containing an ethylenic unsaturation are: glycidyl acrylate, glycidyl methacrylate, monoglycidyl ester of itaconic acid, glycidyl ester of maleic acid, vinyl glycidyl ether, allyl glycidyl ether and the like, or mixtures thereof.

Monocarboxylic or dicarboxylic acids, having at least one ethylenic unsaturation, or derivatives thereof, which may be used as coupling agents are, for example: maleic acid, maleic anhydride, fumaric acid, citraconic acid, itaconic acid, acrylic acid, methacrylic acid and the like, and anhydrides or esters derived from these, or mixtures thereof. Maleic anhydride is particularly preferred.

The coupling agents may be used as such or pre-grafted onto a polyolefin, for example polyethylene or copolymers of ethylene with an α-olefin, by means of a radical reaction (see, for example, European Patent Application EP 530,940). The amount of pre-grafted coupling agent is generally between 0.05 parts by weight and 5 parts by weight, preferably between 0.1 parts by weight and 2 parts by weight, relative to 100 parts by weight of polyolefin. Polyolefins pre-grafted with maleic anhydride are available as commercial products known, for example, under the brand names Fusabond® (Du Pont), Orevac® (Elf Atochem), Exxelor® (Exxon Chemical), Yparex® (DSM), etc.

Alternatively, the coupling agents of carboxylic or epoxide type mentioned above (for example maleic anhydride) or the short chain silanes with ethylenic unsaturation (for example vinyltrimethoxysilane) may be added to the flame-retardant polymeric material in combination with a radical initiator so as to graft the compatibilizing agent directly onto the polymer. An organic peroxide such as tert-butyl perbenzoate, dicumyl peroxide, benzoyl peroxide, di-tert-butyl peroxide, or mixtures thereof may, for example, be used as initiator. This method is described, for example, in U.S. Pat. No. 4,317, 765, in Japanese Patent Application JP 62/58774, or in International Patent Application WO 99/05688 and WO 00/19452.

The amount of coupling agent to be added to the flame-retardant polymeric material may vary mainly depending on the type of coupling agent used and on the amount of inorganic flame-retardant filler added, and is generally between 0.01% and 5%, preferably between 0.05% and 2%, by weight relative to the total weight of the polymeric material.

Conventional antioxidants suitable for the purpose are, for example, distearylthio-propionate, tetrakis[3-(3,5-di-t-butyl-4-hydroxyphenyl)propionyloxymethyl]methane, 2,2'-thiodiethylene bis[3-(3,5-di-tert-butyl-4-hydroxy-phenyl)propionate], polymerized trimethyldihydroquinoline, 4,4'-thiobis (3-methyl-6-tert-butyl)phenol; or mixtures thereof.

Other fillers which may be added to the flame-retardant polymeric material, besides the flame-retardant inorganic fillers above mentioned, include, for example, glass particles, glass fibres, calcinated kaolin, talc, or mixtures thereof. Said fillers, contrary to the flame-retardant inorganic fillers above mentioned, do not undergo decomposition reactions at the usual combustion temperatures which might lead to products capable of actively intefering with the combustion process (for example, calcium carbonate decomposes at about 825° C.).

Processing co-adjuvants usually added to the flame-retardant polymeric material are, for example, calcium stearate, zinc stearate, stearic acid, paraffin wax, silicone rubbers, or mixtures thereof.

Another component that may be added to the flame-retardant polymeric material is at least one dehydrating agent, such as calcium oxide or a zeolite, generally in an amount of from 0.5 to 15% by weight with respect to the weight of the flame-retardant filler, as described in International Patent Application WO 00/39810.

BRIEF DESCRIPTION OF THE DRAWINGS

The description, given hereinbelow, is in reference to the attached drawings, which are provided purely for illustrative purposes and do not imply any limitation of the present invention, and wherein.

DETAILED DESCRIPTION OF THE INVENTION

Figure 1:
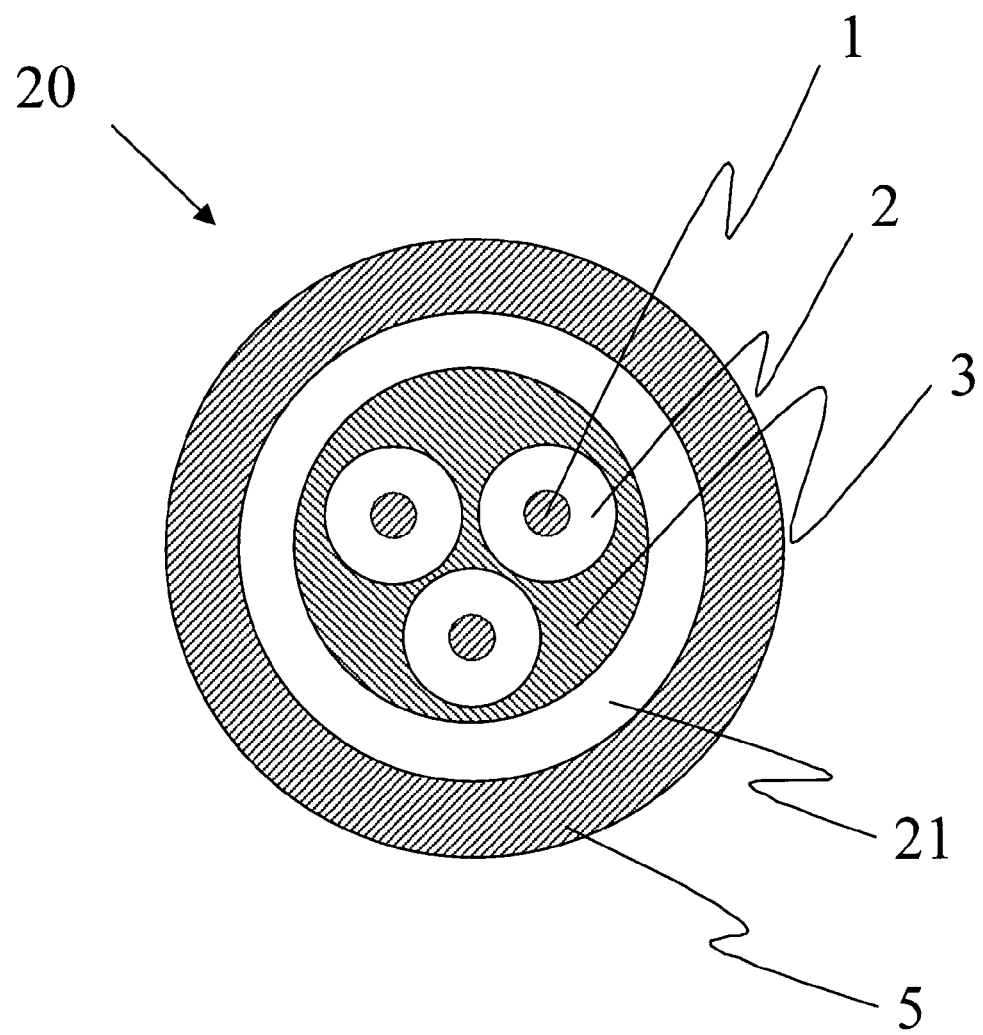
FIG. 1 shows, in cross section, a first embodiment of a tripolar cable according to the present invention.

An electrical cable (20) according to the present invention is illustrated in cross section in FIG. 1.

This cable (20) is of the tripolar type and comprises three conductors (1), each coated with a coating layer (2) which functions as electrical insulation. The semi-finished structure (1, 2) is defined as the core of cable (20).

Said insulation coating layer (2) may consist of a halogen-free, crosslinked or non-crosslinked polymeric composition with electrical insulating properties, which is known in the art, selected, for example, from: polyolefins (homopolymers or copolymers of various olefins), ethylenically unsaturated olefin/ester copolymers, polyesters, polyethers, polyether/polyester copolymers, and blends thereof. Examples of such polymers are: polyethylene (PE), in particular linear low-density PE (LLDPE); polypropylene (PP); propylene/ethylene thermoplastic copolymers; ethylene/propylene rubbers (EPR) or ethylene/propylene/diene rubbers (EPDM); natural rubbers; butyl rubbers; ethylene/vinyl acetate (EVA) copolymers; ethylene/methyl acrylate (EMA) copolymers; ethylene/ethyl acrylate (EEA) copolymers; ethylene/butyl acrylate (EBA) copolymers; ethylene/α-olefin copolymers, or mixture thereof.

With reference to FIG. 1, the three cores are roped together and the interstitial zones thus obtained between said cores are filled with the expanded flame-retardant polymeric material made according to the present invention to define a filling layer (3) having a structure of essentially circular cross-section.

In a position radially external to said filling layer (3) is placed a flame-retardant coating layer (21) which comprises the expanded flame-retardant polymeric material made according to the present invention. The latter is, in turn, coated with an outer polymeric sheath (5).

Preferably, the polymeric sheath (5) is made of a polymeric material selected from the group comprising: polyolefins, copolymers of different olefins, unsaturated olefin/ester copolymers, polyesters, polyethers, polycarbonates, polysulphones, phenolic resins, ureic resins, and mixtures thereof. Examples of suitable polymers are: polyethylene (PE), in particular low density PE (LDPE), medium density PE (MDPE), high density PE (HDPE) and linear low density PE (LLDPE); polypropylene (PP); elastomeric ethylene-propylene copolymers (EPR) or ethylene-propylene-diene terpolymers (EPDM); natural rubber; butyl rubber; ethylene/vinyl ester copolymers, for example ethylene/vinyl acetate (EVA); ethylene/acrylate copolymers, in particular ethylene/methyl acrylate (EMA), ethylene/ethyl acrylate (EEA), ethylene/butyl acrylate (EBA); ethylene/α-olefin thermoplastic copolymers; polystyrene; acrylonitrile-butadiene-styrene resins (ABS); halogenated polymers, in particular polyvinyl chloride (PVC); polyurethane (PUR); polyamides; aromatic polyesters, such as polyethylene terephthalate (PET) or polybutylene terephthalate (PBT), and copolymers or mechanical mixtures thereof.

Figure 2:
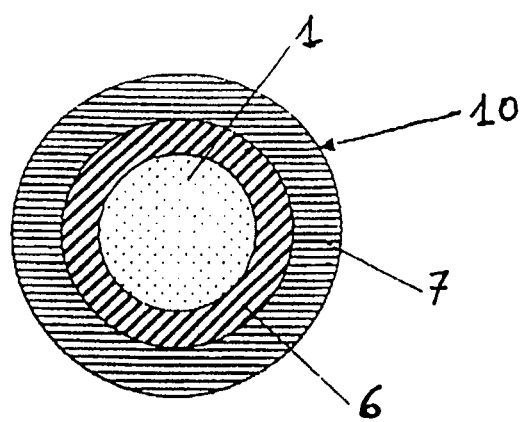
FIG. 2 shows, in cross section, an electrical cable of the unipolar type according to a second embodiment of the present invention.

FIG. 2 shows, in cross section, an electrical cable of the unipolar type according to one embodiment of the present invention.

Referring to FIG. 2, cable (10) comprises a conductor (1), an internal insulation coating layer (6) and an external coating layer (7) which comprises the expanded flame-retardant polymeric material made according to the present invention. The semi-finished structure (1, 6) is defined as the core of cable (10).

Figure 3:
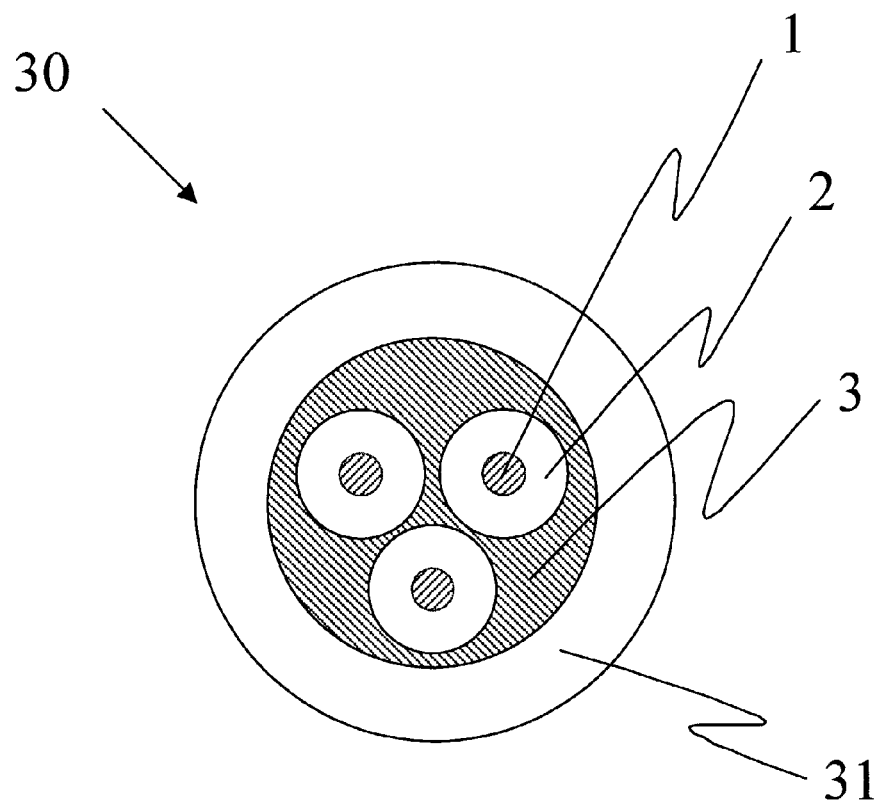
FIG. 3 shows, in cross section, a further embodiment of a tripolar cable according to the present invention.

FIG. 3 illustrates, in cross section, another embodiment of a self-extinguishing electrical cable (30) according to the present invention. The cable is of the tripolar type and comprises three conductors (1), each coated with a coating layer (2) which functions as electrical insulation (said layer (2) being made as disclosed above). As mentioned above, this semi-finished structure (1, 2) is defined as core.

With reference to FIG. 3, the three cores are roped together and the interstitial zones thus obtained between said cores are filled with the expanded polymeric material made according to the present invention to define a filling layer (3) having a structure of essentially circular cross-section.

In a position radially external to said filling layer (3) is placed a non-expanded flame-retardant coating layer (31). Preferably, said non-expanded flame retardant coating layer is a dual-layer coating (not shown in FIG. 3) wherein the radially internal layer is made from a non-expanded polymeric material and the radially external layer is made from an expanded polymeric material. Alternatively, said flame-retardant coating layer (31) comprises the expanded polymeric material made according to the present invention.

In contrast with cable (20) shown in FIG. 1, the cable (30) of this embodiment is not provided with any outer polymeric sheath (5).

Figure 4:
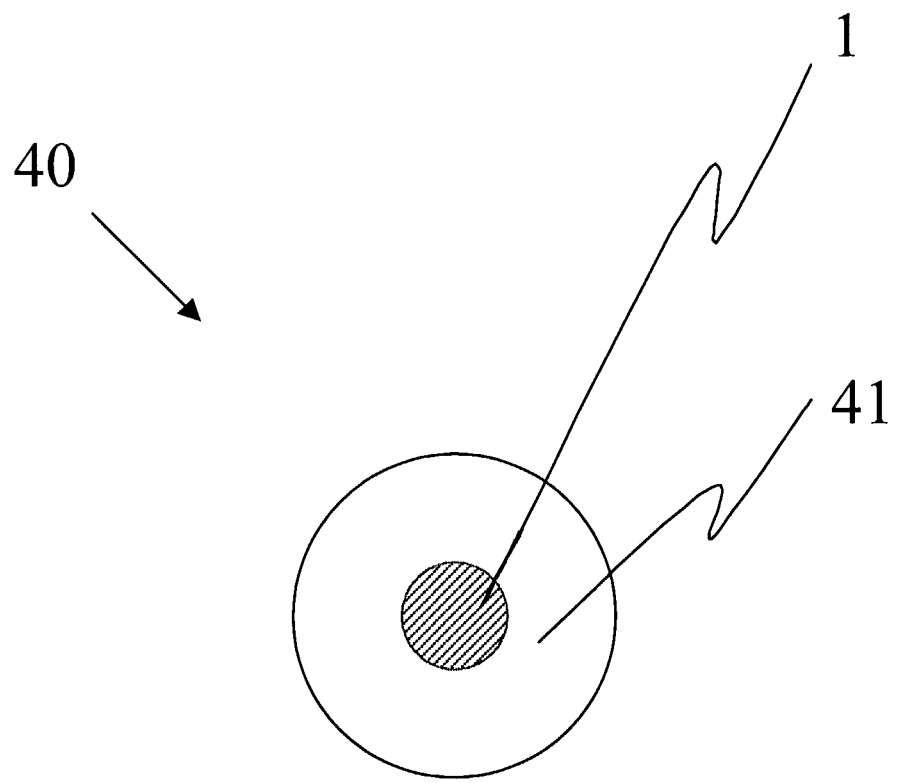
FIG. 4 shows, in cross section, a further embodiment of a unipolar cable according to the present invention.

FIG. 4 illustrates, in cross section, an embodiment of a self-extinguishing electrical cable (40) of unipolar type according to the present invention, for example a telecommunication cable or a data transmission cable. This cable (40) comprises one conductor (1), surrounded by an insulation coating layer (41) which comprises an expanded flame-retardant polymeric material made according to the present invention. Also in this case, the cable (40) is not provided with an outer protective sheath (5).

Figure 5:
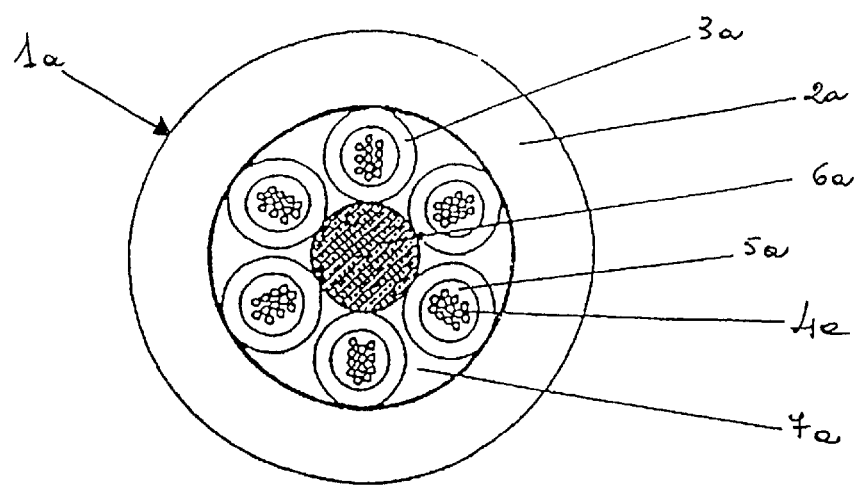
FIG. 5 shows, in cross section, an optical cable according to a further embodiment of the present invention.

FIG. 5 is a sectional view of an optical cable (1a) comprising an external coating layer (2a) which comprises an expanded flame-retardant polymeric material made according to the present invention, a plurality of tubes (3a) of polymeric material within which are enclosed some optical fibres (4a), normally embedded in a packing material (5a) which has the purpose of preventing the longitudinal propagation of water in case of accidental breaking. The tubes containing the optical fibres are wound around a central support (6a) normally made of glass-fiber reinforced plastic and capable of limiting the thermal contractions of the cable (the stranding may be of the continuous or alternate type, commonly called S-Z). Optionally, in order to limit the longitudinal propagation of water inside the cable, an interstitial packing material (7a), may be inserted between the external layer (2a) and the tubes (3a), the packing material being capable of penetrating into the interstices between the tubes and the coating layer, between one tube and the next, and between the tubes and the support.

Figure 6:
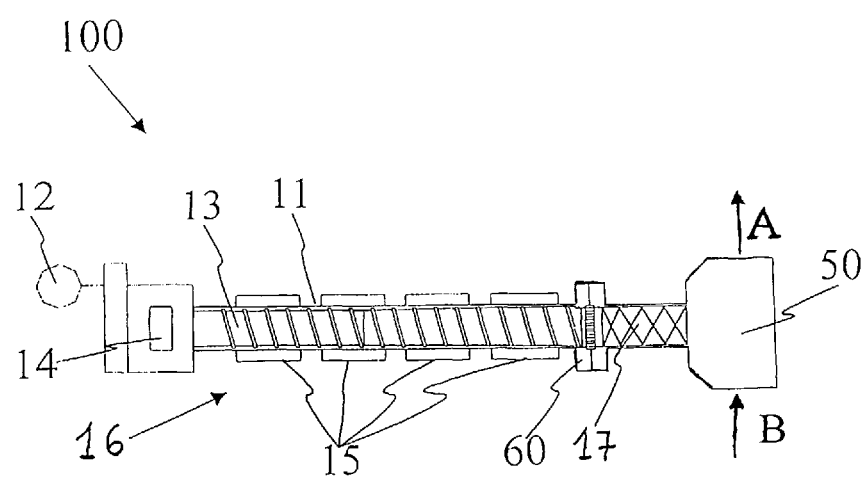
FIG. 6 shows, in cross section, a partial top-plan view of a production line according to the present invention.

FIG. 6 diagrammatically represents a plant (100) in accordance with one particular embodiment of the process according to the present invention.

In detail, the plant (100) illustrated in FIG. 6 mainly comprises: an extruder (16), a static mixer (17) and an extrusion head (50).

The extruder (16), shown diagrammatically, comprises a barrel (11) wherein, via a suitable motor means (12), a screw (13) is rotated for melting and mixing the flame-retardant polymeric material.

Preferably, the flame-retardant polymeric material as disclosed above, is introduced into the extruder (10) via a feed pipe (14), for example a hopper, and subjected to processing by passing said material into the space between the inner surface of the barrel (11) and the outer surface of the screw (13).

The extruder (16) moreover has a plurality of heating units (15) distributed along the length of the screw (13), which provide the amount of heat required to melting the flame-retardant polymeric material.

In accordance with the present invention, the plant (100) moreover includes a static mixer (40) which function is to optimise the mixing of the expanding agent into the flame-retardant polymeric material such that the expanding agent may be uniformly distributed throughout the thickness of the coating layer to be produced.

Finally, downstream of the static mixer (17), the plant (100) includes an extrusion head (50) provided to shape one or more coating layers of polymeric material around the conductor, the number of said coating layers depending on the type of cable being processed.

For example, when the plant (100) in FIG. 6 is intended for the production of the cable (10) shown in FIG. 2, the conductor (1) with the internal insulation coating layer (6) [i.e. the cable core of cable (10)], which is generally unwound from a feed reel (not shown in FIG. 2) placed on the line, is fed to the extrusion head (50) (arrow B). At the exit of the extrusion head (50) (arrow A) a cable (10) with the external coating layer (7) comprising the expanded flame-retardant polymeric material is obtained.

Generally, the cable thus obtained, leaving the extrusion head (50), is subjected to a cooling step which may be carried out, for example, by passing the abovementioned core through a cooling channel, wherein a suitable fluid is placed, typically well water or water cooled to a temperature of about 12° C.-15° C.

As reported above, the expandable polymer and the flame-retardant inorganic fille may be premixed before being fed to the extruder. The premixing step may be made according to methods known in the art. For example, the expandable polymer, the inorganic flame-retardant filler and the optional additives (for example, antioxidants, and co-adjuvants for processing the polymeric material), may be mixed in an internal mixer of the type with tangential rotors (Banbury mixer) or with interpenetrating rotors, or alternatively in continuous mixers such as those of the Ko-kneader type (Buss mixer) or of the type with co-rotating or counter-rotating twin screws.

Thus, once the mixing has been carried out, the flame-retardant polymeric material obtained in the premixing step is added to the extruder (16), together with the expanding agent, and, as reported above, the extrusion operation of said polymeric material directly over the insulation layer (6) is carried out, and the stage of expanding the polymeric material is carried out during said extrusion operation.

It has been observed that, under equivalent extrusion conditions (such as rotation speed of the screw, speed of the extrusion line, diameter of the extruder head), one of the process variables which has the greatest influence on the expansion degree is the extrusion temperature. In any case, the extrusion temperature has to be maintained below the decomposition temperature of the inorganic flame-retardant filler used.

In addition, it is possible to control the expansion degree of the polymer to a certain extent by modifying the cooling rate. Specifically, by appropriately slowing down or advancing the cooling of the polymer which forms the expanded coating layer at the extruder outlet, the expansion degree of said polymeric material may be increased or decreased.

In accordance with the present invention, the expansion degree may range from 2% to 100%, preferably from 10% to 60%, most preferably from 20% to 50%.

The expanded polymeric material may be crosslinked or non-crosslinked. The crosslinking is carried out, after the stage of extrusion and expansion, according to known techniques, in particular by heating in the presence of a radical initiator, for example an organic peroxide such as dicumyl peroxide, optionally in the presence of a crosslinking co-agent such as, for example, 1,2-polybutadiene, triallyl cyanurate or triallyl isocyanurate.

Typically, for an electrical cable for low-voltage power transmission or distribution, the thickness of the flame-retardant coating layer according to the present invention is preferably between 0.5 mm and 6 mm, more preferably between 1 mm and 4 mm.

The figures mentioned above show only some of the possible embodiments of cables wherein the present invention may be advantageously used.

It is clear that suitable modifications may be made to the embodiments mentioned above, though this does not imply any limitation in carrying out the present invention. For example, cores with sectorial cross section may be envisaged, such that when these cores are combined together a cable with approximately circular cross section is formed, without the need to provide a filling layer (3); the flame-retardant coating layer according to the invention being then extruded directly onto these cores combined together as above, followed by the extrusion of the outer polymeric sheath (5).

Further approaches are known to those skilled in the art, who are capable of evaluating the most convenient solution as a function, for example, of the costs, where the cable is laid (aerial, inserted in pipes, buried directly in the ground, inside buildings, under the sea, etc.) and of the working temperature of the cable (maximum and minimum temperatures, changes of environmental temperature).

Some illustrative examples will now be given to describe the invention in further detail.

Example 1

A flame-retardant polymeric material given in Table 1 (the amounts of the various components are expressed in parts by weight per 100 parts by weight of the polymeric base) was prepared as follows.

All the ingredients were mixed in a closed Banbury mixer (volume of the mixing chamber: 1200 cm$^3$) with a volume filling of 95%. The mixing was carried out at a temperature of 180° C. for a total time of 10 min (rotor speed: 44 revolutions/min).

TABLE 1

EXAMPLE 1

| | |
|---|---|
| Engage ® 8003 | 80.00 |
| Moplen ® EP1X35HF | 10.00 |
| Orevac ® 18303 | 10.00 |
| Irganox ® 1010 | 0.50 |
| Rhodorsil ® MF175U | 1.50 |
| Hydrofy ® G-2.5 | 160.00 |
| Total | 262.00 |

Engage® 8003: ethylene/1-octene copolymer obtained by metallocene catalysis: ethylene/1-octene weight ratio=82/18 (5.5% by mole of 1-octene); d=0.885 g/cm$^3$; MFI=1.0 g/10'; CDI>70%; $\Delta H_{2m}$=55.6 J/g (Dow-Du Pont);

Moplen® EP1X35HF:—propylene/ethylene random crystalline copolymer: d=0.900 g/cm$^3$; MFI=9.0 g/10';

$T_{2m}$=154° C.; $\Delta H_{2m}$=90.6 J/g (Montell);

Orevac® 18303: LLDPE grafted with maleic anhydride (MA):

0.3 wt % MA; d=0.917 g/cm$^3$; MFI=2 g/10' (Elf Atochem);

Irganox® 1010: tetrakis[3-(3,5-di-t-butyl-4-hydroxyphenyl)propionyloxymethyl]methane (antioxidant Ciba-Geigy);

Rhodorsil® MF175U: processing coadjuvant/lubricant (silicone rubber—Rhone Poulenc);.

Hydrofy G2.5: natural magnesium hydroxide surface treated with stearic acid (Nuova Sima).

Example 2

A low-voltage cable was prepared according to a construction scheme similar to that given in FIG. 3.

Each of the three cores possessed by said cable consisted of a copper conductor (of cross section equal to 1.5 mm$^2$) coated on the extrusion line with a 0.7 mm thick insulating layer based on silane-crosslinked polyethylene.

A filling layer, made from the flame-retardant polymeric material described in Example 1, subsequently expanded as below reported, was deposited, by extrusion, on said cores (each having an outside diameter of about 3.0 mm). The thickness of said filling layer was equal to about 0.9 mm in the portion radially external to said cores, i.e. on the extrados regions of these cores. A Bandera 30 mm single-screw extruder in configuration 25 D was used to deposit the filling layer.

A flame-retardant coating layer, made from the flame-retardant polymeric material described in Example 1, was deposited on the filling layer thus obtained. Said coating layer had a thickness equal to 0.9 mm, and the extrusion was carried out using a Maillefer 45 mm single-screw extruder in configuration 24 D.

Said filling layer and said flame-retardant coating layer were co-extruded.

Expansion of the flame-retardant polymeric material of the filling layer was obtained by adding into the extruder hopper 0.3% by weight (relative to the total weight of the flame-retardant polymeric material of Example 1) of the expanding agent Hostatron® PVA 0050243 ZN, produced by Clariant which corresponds to the masterbatch reported in the following Table 2 (expressed in parts by weight-% wt):

TABLE 2

| | |
|---|---|
| Ethylene-vinyl acetate copolymer (EVA) | 60% |
| Lagocell20 ® (expanding agent) | 20% |
| LagocellBO20 ® (expanding agent) | 20% |

Lagocell20® is azodicarbonamide, produced by Lagor S.p.A;

LagocellBO20® is 4,4'-oxybis(benzenesulfonylhydrazide), produced by Lagor S.p.A.

The extrusion line speed if of 7 m/min.

The expanded flame-retardant polymeric material constituting the flame-retardant filling layer had a final density equal to 1.17 kg/dm$^3$ and an expansion degree equal to about 30%, calculated as described above.

Tables 3 and 4 give the temperature profile and the operating parameters of the extruder used to obtain the filling layer and the flame-retardant coating layer.

The cable was then cooled in water and wound on a reel.

Table 5 gives the mechanical properties measured on the cable produced.

TABLE 3

| Extruder zone | Extruder for the filling layer (° C.) | Extruder for the flame-retardant coating layer (° C.) |
| --- | --- | --- |
| zone 1 | 160 | 150 |
| zone 2 | 170 | 160 |
| zone 3 | 180 | 170 |
| zone 4 | 180 | 170 |
| zone 5 | 110 | 170 |
| head | 170 | 170 |
| die | 170 | 170 |

TABLE 4

| Parameter | Extruder for the filling layer | Extruder for the flame-retardant coating layer |
| --- | --- | --- |
| Extruder pressure | 180 bar | 210 bar |
| Extruder screw speed | 72 rpm | 36 rpm |

Mechanical Properties.

The mechanical properties were measured according to CEI standard 20-11 (Publication year: 1999) on cable specimens. Said cable specimens had a dual-layer structure wherein the radially outer layer was the non-expanded flame-retardant coating layer and the radially inner layer was the expanded filling layer.

TABLE 5

| Property | |
| --- | --- |
| Tensile strength | 10.3 MPa |
| Elongation at break | 135% |

Evaluation of the Expanded Flame-Retardant Polymeric Material

A low-voltage cable was prepared as disclosed in Example 2, the only difference being the fact that the flame-retardant coating layer was not co-extruded onto the flame-retardant filling layer.

Figure 7:
FIG. 7 is a photograph showing the outer surface of the expanded filling material obtained by the process according to the present invention.
Figure 8:
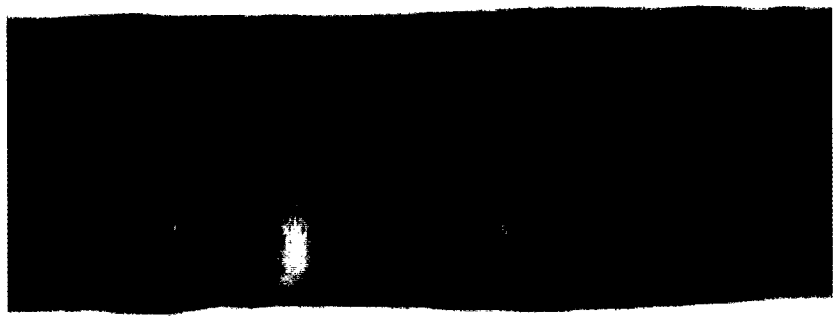
FIG. 8 is a photograph showing the outer surface of the expanded filling material obtained without the static mixer.

(a) FIG. 7 and FIG. 8 show the outer surface of the expanded filling material. The photographs clearly show that the outer surface of the expanded filling material obtained without the static mixer (FIG. 8) is not homogeneous and a plurality of bubbles is present. On the contrary, the outer surface of the expanded filling material obtained with the static mixer according to the process of the present invention (FIG. 7) is homogeneous and has a smooth appearance.

Figure 9:
FIG. 9 is a photograph (25X) obtained from scanning electron microscope (SEM) showing a sample of the expanded filling material obtained by the process according to the present invention.
Figure 10:
FIG. 10 is a photograph (25X) obtained from scanning electron microscope (SEM) showing a sample of the expanded filling material obtained without the static mixer.

(b) A 3 cm length of the cable was introduced into a liquid nitrogen bath, was subsequently removed from the bath and was transversally cut. A sample of the expanded filling material was obtained from the cable section and checked by subjecting the same, previously gold sputtered, to the scanning electron microscopic photography by means of Jeol JSM-840A scanning electron microscope (SEM). The obtained photographs are reported in FIG. 9 (25X) and FIG. 10 (25X). The photographs clearly show that the surface of the sample of the expanded filling material obtained without the static mixer (FIG. 10) is not homogeneous and presents a bubble of remarkable size (A). On the contrary, the surface of the sample of the expanded filling material obtained with the static mixer according to the process of the present invention (FIG. 9) is homogeneous and presents bubbles of regular and small size.

The invention claimed is:

1. A process for manufacturing a self-extinguishing cable comprising at least one transmissive element and at least one flame-retardant coating in a position radially external to said at least one transmissive element, wherein said at least one coating comprises an expanded flame-retardant polymeric material comprising:
   (a) at least one expandable polymer;
   (b) at least one expanding agent;
   (c) at least one flame-retardant inorganic filler in an amount of 120 parts by weight to 200 parts by weight with respect to 100 parts by weight of the polymer;
   the process comprising:
   (i) providing said at least one expandable polymer, said at least one expanding agent, and said at least one flame-retardant inorganic filler to form said flame-retardant material;
   (ii) feeding the flame-retardant polymeric material to an extruding apparatus, therein melting and mixing it;
   (iii) passing the flame-retardant polymeric material obtained in step (ii) through at least one static mixer; and
   (iv) depositing by extrusion the flame-retardant polymeric material obtained in step (iii) onto said at least one transmissive element conveyed to said extruding apparatus, and thereby expanding the flame-retardant polymeric material,
   wherein the expanded flame retardant polymeric material has an expansion degree of 30% to 50%.

2. The process according to claim 1, wherein the at least one expandable polymer and the at least one flame-retardant inorganic filler are premixed before the step of feeding them to the extruding apparatus.

3. The process according to claim 1, wherein the at least one flame-retardant coating has electrical insulation properties.

4. The process according to claim 3, wherein the at least one flame-retardant coating is an insulation coating layer placed in a position radially external to said transmissive element.

5. The process according to claim 4, wherein the insulation coating layer is placed in direct contact with the transmissive element.

6. The process according to claim 1, wherein the cable comprises at least two transmissive elements and a filling material which fills the interstitial zones between said at least two transmissive elements, said filling material comprising said expanded flame-retardant polymeric material.

7. The process according to claim 1, wherein the expandable polymer is selected from: polyolefins, copolymers of various olefins, olefin/unsaturated ester copolymers, polyesters, polyethers, polycarbonates, polysulphones, phenolic resins, ureic resins, or mixtures thereof.

8. The process according to claim 7, wherein the expandable polymer is selected from: polyethylene, polypropylene, elastomeric ethylene/propylene copolymers, ethylene/propylene/diene terpolymers, natural rubber, butyl rubber, ethylene/vinyl ester copolymers, ethylene/acrylate copolymers, ethylene/α-olefin thermoplastic copolymers, polystyrene, acrylonitrile/butadiene/styrene resins, halogenated polymers, polyurethane, polyamides, aromatic polyesters, copolymers or mechanical blends thereof, or mixtures thereof.

9. The process according to claim 7, wherein the expandable polymer is a polyolefinic polymer or copolymer based on ethylene and/or propylene.

10. The process according to claim 9, wherein the expandable polymer is selected from: polyethylene, copolymers of ethylene with a least one α-olefin containing from 3 to 12 carbon atoms, polypropylene, thermoplastic copolymers of propylene with ethylene and/or at least one α-olefin containing from 4 to 12 carbon atoms, copolymers of ethylene with at least one ester selected from alkyl acrylates, alkyl methacrylates and vinyl carboxylates, wherein the alkyl and the carboxylic groups therein are linear or branched, and wherein the linear or branched alkyl group may contain from 1 to 8 carbon atoms, while the linear or branched carboxylic group may contain from 2 to 8 carbon atoms, or mixtures thereof.

11. The process according to claim 1, wherein the expandable polymer is selected from:
    (a) copolymers of ethylene with an ethylenically unsaturated ester, wherein the amount of the unsaturated ester is 5% by weight to 50% by weight;
    (b) elastomeric copolymers of ethylene with at least one $C_3$-$C_{12}$ α-olefin, and optionally a diene, having the following composition: 35 mol %-90 mol % of ethylene, 10 mol %-65 mol % of α-olefin, and 0 mol %-10 mol % of the diene;
    (c) copolymers of ethylene with at least one $C_4$-$C_{12}$ α-olefin, and optionally a diene, having a density of 0.86 g/cm$^3$ to 0.90 g/cm$^3$ and the following composition: 75 mol %-97 mol % of ethylene, 3 mol %-25 mol % of α-olefin, and 0 mol %-6 mol % of a diene;
    (d) polypropylene modified with ethylene/$C_3$-$C_{12}$ α-olefin copolymers, wherein the weight ratio between the polypropylene and the ethylene/$C_3$-$C_{12}$ α-olefin copolymer is 50/50 to 30/70.

12. The process according to claim 1, wherein the expandable polymer is selected from a propylene homopolymer or a copolymer of propylene with at least one olefinic comonomer selected from ethylene and an α-olefin other than propylene, having an elastic flexural modulus of 30 to 900 MPa.

13. The process according to claim 12, wherein the propylene homopolymer or a copolymer of propylene with at least one olefinic comonomer selected from ethylene and an α-olefin other than propylene, has the following characteristics:
    a melting point of 140° C. to 165° C.;
    a heat of fusion of 30 J/g to 80 J/g;
    a fraction which is soluble in boiling diethyl ether, in an amount of less than or equal to 12% by weight, having a heat of fusion of less than or equal to 4 J/g;
    a fraction which is soluble in boiling n-heptane, in an amount of 15% to 60% by weight, having a heat of fusion of 10 J/g to 40 J/g; and
    a fraction which is insoluble in boiling n-heptane, in an amount of 40% to 85% by weight, having a heat of fusion of greater than or equal to 45 J/g.

14. The process according to claim 1, wherein the expanding agent is selected from compounds containing at least one nitrogen atom.

15. The process according to claim 14, wherein the expanding agent is selected from: ammonium salts, urea, melamine, guanidine, melamine cyanurate, guanidylurea, azodicarbonamide, hydrazides, para-toluenesulphonylhydrazide, benzenesulfonylhydrazide, 4,4'-oxybis(benzenesulfonylhydrazide), azobis(isobutyronitrile), dinitro pentamethylene tetramine, expandingly acceptable derivatives thereof, or mixtures thereof.

16. The process according to claim 15, wherein the expanding agent is azodicarbonamide, 4,4'-oxybis(benzenesulfonylhydrazide), or mixtures thereof.

17. The process according to claim 1, wherein the expanding agent is selected from mixtures of organic acid with carbonates and/or bicarbonates.

18. The process according to claim 1, wherein the expanding agent is added to the flame-retardant polymeric material in an amount of 0.01 part by weight to 5.0 parts by weight with respect to 100 parts by weight of the expandable polymer.

19. The process according to claim 18, wherein the expanding agent is added to the flame-retardant polymeric material in an amount of 0.1 part by weight to 2.0 parts by weight with respect to 100 parts by weight of the expandable polymer.

20. The process according to claim 1, wherein the expanding agent is compounded as a masterbatch formed by mixing the expanding agent with an olefin-based polymer.

21. The process according to claim 20, wherein the olefin-based polymer is ethylene/vinyl acetate copolymer.

22. The process according to claim 20, wherein the masterbatch comprises an amount of expanding agent of 1% by weight to 80% by weight with respect to the total weight of the olefin-based polymer.

23. The process according to claim 22, wherein the masterbatch comprises an amount of expanding agent of 10% by weight to 70% by weight with respect to the total weight of the olefin-based polymer.

24. The process according to claim 1, wherein the flame-retardant polymeric material comprises at least two expanding agents, said expanding agents being present in a ratio of 0.5:3.

25. The process according to claim 24, wherein said expanding agents are present in a ratio of 1:2.

26. The process according to claim 25, wherein said expanding agents are present in a ratio of 1:1.

27. The process according to claim 1, wherein the flame-retardant inorganic filler is selected from hydroxides, hydrated oxides, salts or hydrated salts of metals, or mixtures thereof.

28. The process according to claim 27, wherein the flame-retardant inorganic filler is selected from: magnesium hydroxide, alumina trihydrate, magnesium hydrated carbonate, magnesium carbonate, mixed hydrated carbonate of magnesium and calcium, mixed magnesium and calcium carbonate, or mixtures thereof.

29. The process according to claim 27, wherein the flame-retardant inorganic filler is in the form of particles which are untreated or surface-treated with saturated or unsaturated fatty acids containing from 8 to 24 carbon atoms, or metal salts thereof.

30. The process according to claim 1, wherein at least one coupling agent is added to the flame-retardant polymeric material, said coupling agent being selected from short chain saturated silane compounds or silane compounds containing at least one ethylenic unsaturation, epoxides containing an ethylenic unsaturation, monocarboxylic acids or dicarboxylic acids having at least one ethylenic unsaturation, or derivatives thereof.

31. The process according to claim 30, wherein the coupling agent is pre-grafted onto a polyolefin.

* * * * *